US007756987B2

(12) United States Patent
Wang et al.

(10) Patent No.: US 7,756,987 B2
(45) Date of Patent: Jul. 13, 2010

(54) CYBERSQUATTER PATROL (75) Inventors: Yi-Min Wang, Bellevue, WA (US);
Douglas Beck, Bothell, WA (US); Chad Verbowski, Redmond, WA (US);
Bradford Daniels, Redmond, WA (US);
Ming Ma, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 104 days.

(21) Appl. No.: 11/696,580

(22) Filed: Apr. 4, 2007

(65) Prior Publication Data
US 2008/0250159 A1 Oct. 9, 2008

(51) Int. Cl.
*G06F 15/173* (2006.01)
(52) U.S. Cl. ...................... 709/229; 709/239
(58) Field of Classification Search ................ 709/239, 709/229
See application file for complete search history.

(56) References Cited

U.S. PATENT DOCUMENTS

| 5,892,919 | A | * | 4/1999 | Nielsen .................... 709/228 |
| 6,092,100 | A | * | 7/2000 | Berstis et al. .............. 709/203 |
| 6,393,465 | B2 | | 5/2002 | Leeds |
| 7,376,752 | B1 | * | 5/2008 | Chudnovsky et al. ....... 709/245 |
| 7,421,498 | B2 | * | 9/2008 | Packer ....................... 709/225 |
| 7,657,507 | B2 | * | 2/2010 | Shi et al. ..................... 1/1 |
| 2002/0099693 | A1 | * | 7/2002 | Kofsky ......................... 707/3 |
| 2004/0010710 | A1 | * | 1/2004 | Hsu et al. .................... 713/201 |
| 2004/0030741 | A1 | | 2/2004 | Wolton et al. |
| 2004/0220903 | A1 | * | 11/2004 | Shah et al. .................... 707/3 |
| 2006/0004748 | A1 | | 1/2006 | Ramarathnam et al. |
| 2006/0036598 | A1 | | 2/2006 | Wu |
| 2006/0069667 | A1 | | 3/2006 | Manasse et al. |
| 2006/0069697 | A1 | | 3/2006 | Shraim et al. |
| 2006/0095416 | A1 | | 5/2006 | Barkhin et al. |
| 2006/0184500 | A1 | | 8/2006 | Najork et al. |
| 2006/0212925 | A1 | * | 9/2006 | Shull et al. ...................... 726/1 |
| 2006/0248072 | A1 | | 11/2006 | Brewer et al. |
| 2006/0253578 | A1 | | 11/2006 | Dixon et al. |
| 2006/0288078 | A1 | * | 12/2006 | Mashimo .................... 709/206 |
| 2007/0179987 | A1 | | 8/2007 | Lim |
| 2009/0300770 | A1 | * | 12/2009 | Rowney et al. .............. 726/26 |

FOREIGN PATENT DOCUMENTS

WO  WO2006036170 A1  4/2006

OTHER PUBLICATIONS

Mozilla, Firefox 1.5.0.10, Feb. 23, 2007.*
Against Intuition, Web of Trust ver. 20070226, Feb. 25, 2007 (Firefox Addon) https://addons.mozilla.org/en-US/firefox/addons/versions/3456.*

(Continued)

*Primary Examiner*—Nathan Flynn
*Assistant Examiner*—James E Conaway
(74) *Attorney, Agent, or Firm*—Lee & Hayes, PLLC (57) ABSTRACT An exemplary method includes providing a typographically erroneous domain name, tracing the domain name where tracing includes entering the domain name as part of a URL and recording one or more subsequent URLs, identifying a domain parking service for the domain name based at least in part on information in one of the recorded URLs, determining client identification information in at least one of the recorded URLs where the client identification information identifies a customer of the domain parking service and blocking one or more domain names based at least in part on the client identification information. Other exemplary technologies are also disclosed.

21 Claims, 9 Drawing Sheets

OTHER PUBLICATIONS

Wang et al., Strider Typo-Patrol: Discovery and Analysis of Systematic Typo-Squatting, Jul. 2006.*
Palant, Adblock Plus ver. 0.7.2.4, Jan. 5, 2007 (Firefox Addon) http://adblockplus.org/en/.*
Wikipedia, Yadis, Jan. 13, 2007.*
Benczur, et al., "SpamRank-Fully Automatic Link Spam Detection", available as early as Dec. 26, 2006, at <<http://airweb.cse.lehigh.edu/2005/benczur.pdf>>, pp. 1-14.
Metaxas, et al., "Web Spam, Propaganda and Trust", availabe as early as Dec. 26, 2006, at <<http://cs.wellesley.edu/~pmetaxas/TR28-2004/spamPropTrust.pdf>>, pp. 1-9.
Wu, et al., "Propagating Trust and Distrust to Demote Web Spam", available as early as Dec. 26, 2006, at <<http://citeseer.ist.psu.edu/cache/papers/cs2/675/http:zSzSzwww.cse.lehigh.eduzSz~brianzSzpubszSz2006zSzMTWzSzpropagating-trust.pdf/propagating-trust-and-distrust.pdf>>, Lehigh University, pp. 1-9.
"MSR Strider URL Tracer", retrieved on Nov. 25, 2009 at >>http://research.microsoft.com/en-us/downloads/7c576d6e-ab43-4a7c-a454-df189cf6356b/>>, Microsoft Research, Microsoft, 1 page.
"Strider URL Tracer with Typo-Patrol" retrieved on Nov. 25, 2009 at >>http://research.microsoft.com/en-us/um/redmond/projects/strider/urltracer/>>, Microsoft Research, Microsoft, 6 pages.

* cited by examiner

CYBERSQUATTER PATROL

BACKGROUND

A typo-squatter refers to a type of cybersquatter that registers one or more typographical variations of a well-known domain name. For example, a typo-squatter may register "microsft" as a domain name in an effort to capture Internet traffic from a person that mistypes the domain name "microsoft". In addition to typographical variations, some cybersquatters register domain names for combination terms such as "microsoftoutlook", which includes a company name and trademark (MICROSOFT®) along with another trademark owned by the company (OUTLOOK®). Various exemplary technologies are described herein to discover cybersquatters and to manage information related to such cybersquatters to enhance security and, in general, to enhance a user's browser experience. In particular, various technologies aim to uncover large-scale and systematic cybersquatters.

SUMMARY

An exemplary method includes providing a typographically erroneous domain name, tracing the domain name where tracing includes entering the domain name as a part of a URL and recording one or more subsequent URLs, identifying a domain parking service for the domain name based at least in part on information in one of the recorded URLs, determining client identification information in at least one of the recorded URLs where the client identification information identifies a customer of the domain parking service and blocking one or more domain names based at least in part on the client identification information. Other exemplary technologies are also disclosed.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Use of various technologies described herein demonstrates that a large number of typo-squatting domains are active and that a large percentage of these typo-squatting domains are parked primarily with a few domain parking services. These domain parking services serve syndicated advertisements on typo-squatting domains. In some instances, syndicated advertisements include adult content. Serious concerns arise where such content appears upon entry of a typographical variation of child-oriented website's domain name. Various exemplary technologies allow a parent to protect a child's web browsing activities, allow a website owner to systematically monitor cybersquatting activities against a website, etc.

Figure 1:
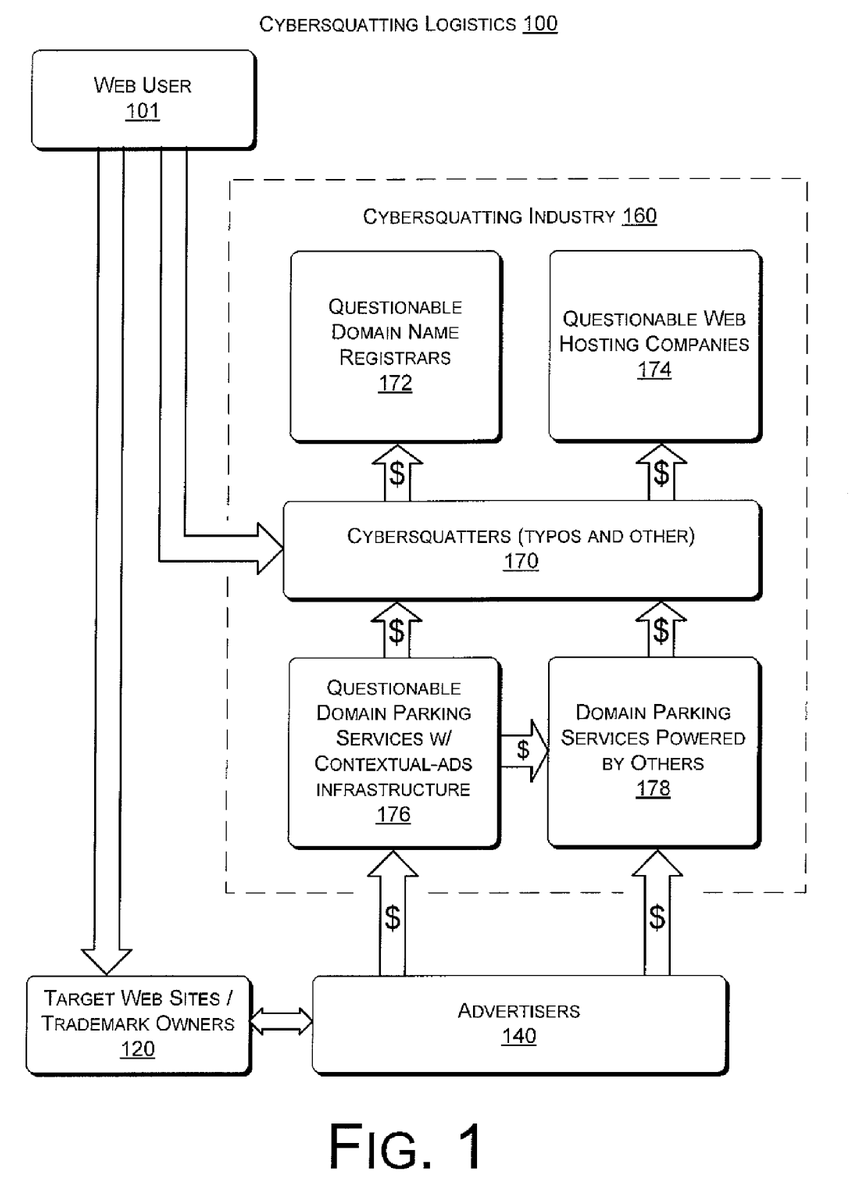
FIG. 1 is a diagram of various entities involved in the cybersquatting industry.

FIG. 1 shows a diagram 100 that provides an overview of cybersquatting logistics. When a web user 101 types a domain name in a web browser application, intending to access a target web site 120, the web user 101 may inadvertently mistype the domain name and enter a domain name associated with a cybersquatter 170. Alternatively, a web user 101 may type a composite domain name, intending to access a target web site 120, where the composite domain name belongs to a cybersquatter 170 and not the owner of the target web site. In either instance, the cybersquatter 170 gets a hit that allows it to present one or more advertisements (or other information) to the web user 101.

The realm of the cybersquatting industry 160 includes questionable domain name registrars 172, questionable web hosting companies 174, questionable domain parking services with contextual ad infrastructure 176 and domain parking services powered by other entities 178. For example, the parking service "sedoparking" provides a domain parking service, but it serves ads from another entity. In another example, an entity may have its own domain parking service that serves its own ads.

While conventional ad syndicators serve relevant contextual ads, for example, based on a publishers' web content, domain parking services serve ads based on domain name alone (e.g., in many instances parked domains have no content). Many cybersquatters take advantage of domain name parking infrastructures to perform large-scale, systematic cybersquatting.

The cybersquatting industry 160 relies on payments by advertisers 140. Various scenarios illustrate how money can flow in the cybersquatting industry 160. For example, to access potential consumers, advertisers 140 enter contracts with domain parking services 176, 178, usually on a payment per click basis. In turn, the domain parking services 176, 178 attempt to maximize clicks through deals with any of variety of entities including cybersquatters 170. Cybersquatters 170 may pay for registration of questionable domain names by domain name registrars and pay for hosting of such domain names with web hosting companies 174 of questionable reputation and business practices. A cybersquatter 170 is an entity that owns or otherwise controls a questionable domain name.

While many domain name registrars are not involved in cybersquatting practices, those that are involved are deemed questionable (questionable domain name registrars 172). A questionable domain name registrar may also be a cybersquatter 170. In general, registrars are accredited by ICANN or another official body. Questionable registrars 172 risk having their accreditation revoked.

Conventional advertisement syndication relies on instructing a client-side browser application to fetch ads from an ads server and to compose the fetched ads with content of a website that a user intends to visit. In such a manner, some type of legitimate association between ad content and website content occurs. For example, an advertiser of automobile insurance may want to display ads on a website for automobile aficionados.

Advertisement syndication typically relies on a third-party URL mechanism of a web browser application. Such a mechanism operates via instructions received when a user visits a primary URL (hosted by the first party) either by typing the primary URL into the browser address bar or by clicking on a link (e.g., on a web page, in an email document, in a general document, etc.). For example, a primary URL page may contain instructions that cause the browser application to automatically visit one or more secondary URLs hosted on third-party servers (e.g., to retrieve additional content such as images). Often, such instructions occur without explicit knowledge or permission from a user. While many secondary URLs are on the primary URL's corresponding first-party domain server, some secondary URLs hosted on third-party servers, such secondary URLs are referred to as third-party URLs. Third-party URLs usually contain information about the primary URL to allow syndicators to serve the most relevant contextual ads based on the primary URL page's content (and potentially historical information about the visiting machine or user).

As already mentioned, domain parking is a special case of advertisement syndication. In domain parking, a primary URL is a parked domain name without any real content. Instead of a web page with meaningful content, a parked domain name displays to a user a web page with syndicated ads, usually in the form of ad listings.

As an example, consider a user that enters "disneychannell.com" via a browser application. This domain name instructs the browser application to load www.sedoparking.com/disneychannell.com, a URL responsible for serving a listing of domain-parking ads. In another example, the domain name "disnychanell.com" causes a browser application to load www.gimmie-games.com, a URL that advertises online games.

Some domain parking services provide additional information in third-party URLs that facilitates analysis. For example, when a browser visits disneyg.com, the response page contains a HTML frame that loads:

apps5.oingo.com/apps/domainpark/domainpark.cgi?s=
        disneyg.com&dp_lp=24&hl=en&dp_lp=7&cid=
        DTRG4295&dp_p4pid=oingo_inclusion_xml_06&
        dp_format=1.3

In this string, the "cid" field contains a Client ID that uniquely identifies a cybersquatter. As discussed herein, various exemplary techniques can use such information to discover typo domain names registered to well-known, serial typo-squatters.

Referring again to the infrastructure 160, domain parking services provide convenient and effective contextual-ads infrastructures that make even marginal typo domain names profitable. With an annual domain name registration fee being as low as $7.00, a parked typo domain name can usually cover this fee by attracting between one unique visitor every two days and two visitors per day (depending on the pay-out levels). In terms of scale, servers owned by two identified domain parking services reached between 3,300 and 5,200 per million users daily to achieve overall server traffic ranks between #221 and #438, numbers comparable to those for popular websites such as travelocity.com (#248), orbitz.com (#315), reuters.com (#342), usatoday.com (#347), and slashdot.org (#375).

Figure 2:
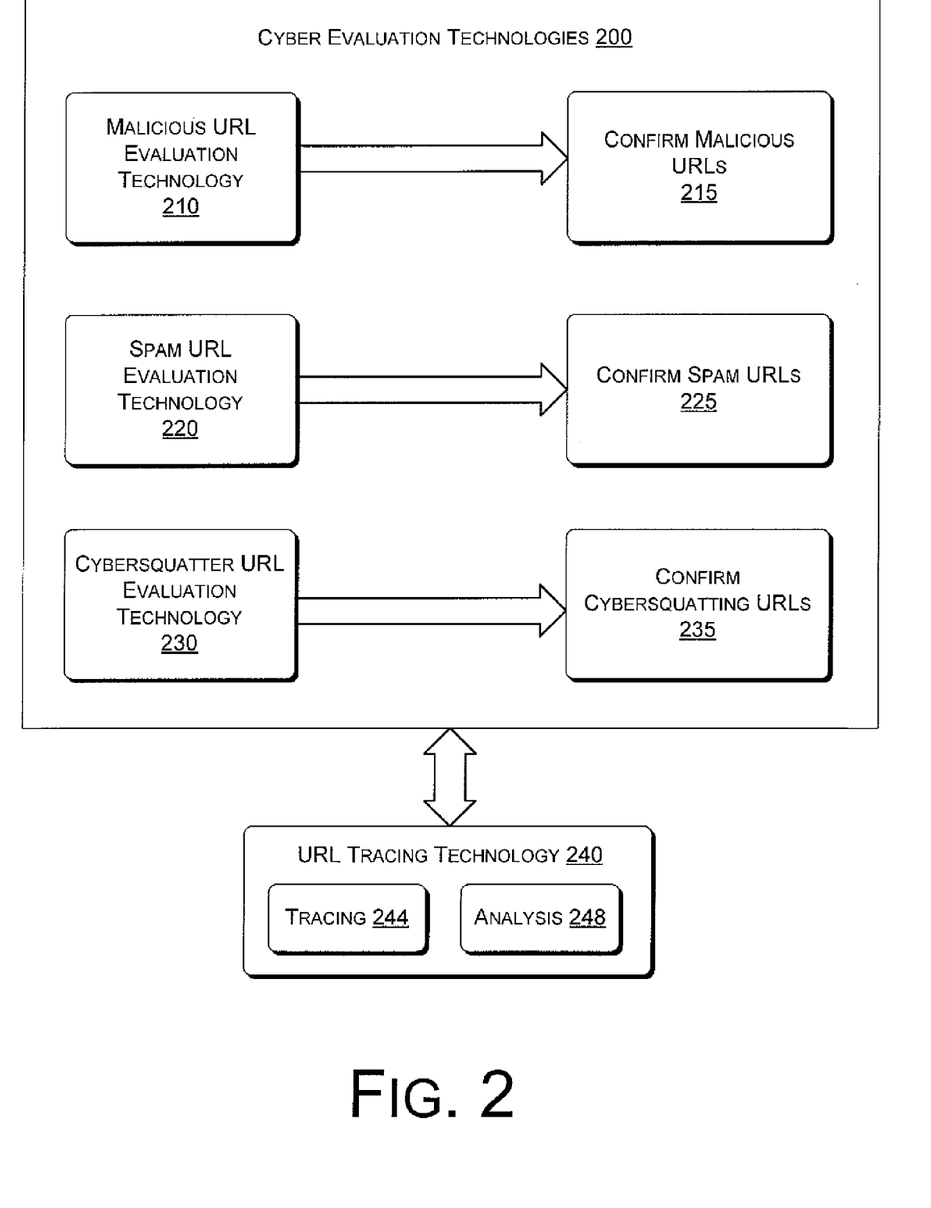
FIG. 2 is a diagram of various technologies for analyzing URLs and actions taken by web pages associated with the URLs.

FIG. 2 shows various cyber evaluation technologies 200 for assessing network addresses such as uniform resource locators (URLs). Malicious URL evaluation technology 210 can determine whether a web site hosts malicious code 215. Spam URL evaluation technology 220 can determine if a web site hosts spam 225. Cybersquatting URL evaluation technology 230 can determine if a domain name is a typographic variation or composite domain name that syndicates ads or provides information unrelated or detrimental to an owner of a legitimate domain name 235. URL tracing technology 240 includes a tracing tool 244 for tracing URLs and an analysis tool 248 for analyzing information obtained via a trace.

The URL tracing technology 240 gathers information associated with URL redirection. For example, when a user visits a web site, a browser application may be instructed to visit other third-party domains without the user's knowledge. Some of the third-party domains can raise security, privacy, and safety concerns. The URL tracing technology 240 reveals the third-party domains. As shown in FIG. 2, the URL tracing technology 240 can assist various cyber patrol technologies. A browser application may include URL tracing technology 240 that allows a user to enter a domain name (e.g., as part of a URL) and to record one or more subsequent URLs as being associated with the domain name.

The malicious URL evaluation technology 210 allows for detection and analysis of web sites hosting malicious code, in particular, code that exploits browser vulnerabilities. While various technologies discussed herein mention browsers, such technologies can optionally be used for detection and analysis of sites that provide any of a variety of types of web based content. For example, many media players can load additional lyrics and purchase information (e.g., as "web pages") and are therefore potentially affected by exploits, etc.

A detection system known as the Strider HoneyMonkey Exploit Detection System has been developed by Microsoft Corporation (Redmond, Wash.). The HoneyMonkey system can detect attacks that use web servers to exploit unpatched browser vulnerabilities and install malware on computing devices of unsuspecting users. Such attacks have become one of the most vexing issues confronting Internet security experts.

Various conventional methods provide a "honeypot" server on the Internet to gain information about attacks and attackers. While manual analyses of exploit sites often provide useful, detailed information about which vulnerabilities are exploited and which malware programs are installed, such analyses do not provide a big-picture view of the problem.

The Strider HoneyMonkey system creates a "honeymonkey" (e.g., an automated honeypot on a computer or a virtual PC) that actively mimics the actions of a user surfing the web. Accordingly, a "monkey program" can drive a browser in a manner similar to that of a human user and run on one or more virtual machines to detect exploit sites.

The spam URL evaluation technology 220 can classify URLs as spam-related 225 by a context-based approach that analyzes URL redirection (e.g., using the URL tracing technology 240). As large-scale cyber scammers (e.g., spammers, etc.) create hundreds or thousands of doorway pages that either redirect to or retrieve ads from a single domain, spam URL evaluation technology 220 can help identify an entire spam operation by uncovering target pages that connect to a large number of doorways. More specifically, by feeding a list of known spam URLs to search engines to find forums, blogs and other pages where more such spam links are located, the spam URL technology can compile the links into a single potential spam URL list. The list can be provided to URL tracing technology 240 to find which domains are associated with a high volume of doorway pages. False positives can be reduced by checking URLs against a whitelist of legitimate ad and web analytics providers.

Accordingly, identification becomes easier as a spammer spreads a URL and once the spam URL evaluation technology 220 identifies a forum for spam, the forum essentially becomes a "Honey Forum" to obtain other spam URLs. Priority for manual investigation generally increases as the number of doorway pages increases. Identification of spam URLs 225 can be followed with either removal of the URLs from a search index or assignment of low relevance ranking to each of the URLs.

Figure 3:
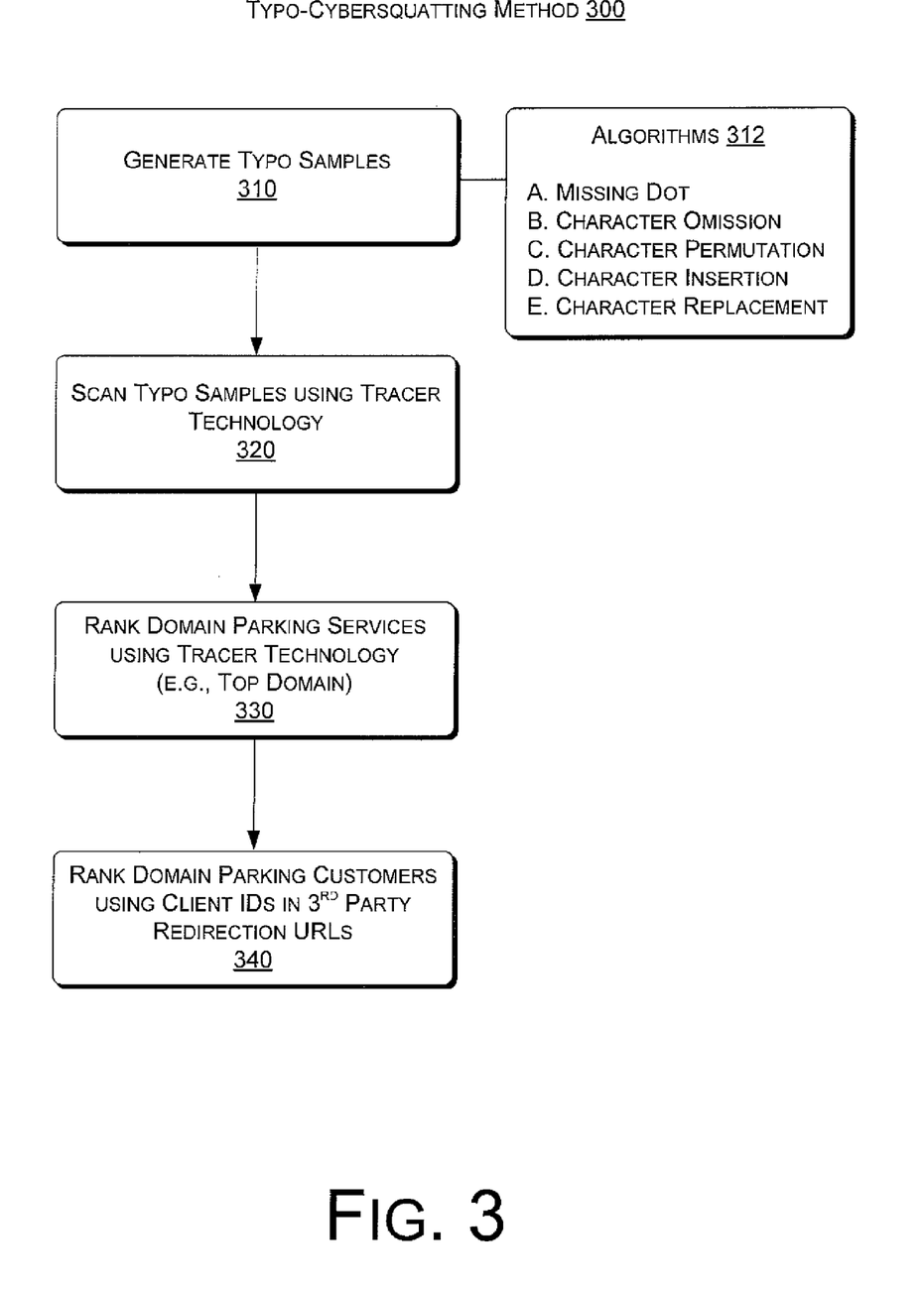
FIG. 3 is a diagram of a method for analyzing typo-cybersquatting.

Cybersquatter URL evaluation technology 230 can identify cybersquatting URLs 235. FIG. 3 shows a particular typo-cybersquatting method 300. The method 300 includes a generation block 310 that generates a so-called typo-neighborhood according to five particular algorithms 312:

(A) Missing-dot typos: The "." following "www" is removed, for example, wwwSouthwest.com, wwwBarbie.com, and wwwMySpace.com.

(B) Character-omission typos: Characters are omitted one at a time, for example, Diney.com, MarthStewart.com, and RuneSape.com.

(C) Character-permutation typos: Consecutive characters are swapped one pair at a time, unless they are the same characters, for example, Rueters.com, NYTiems.com, and Cingluar.com.

(D) Character-replacement typos: Characters are replaced one at a time and a replacement character is selected from a set of characters adjacent to the given character on a standard keyboard, for example, DidneyWorld.com, Luftgansa.com, and USATodsy.com.

(E) Character-insertion typos: characters are inserted one at a time and the inserted character is chosen from a set of characters adjacent to either of the given pair on a standard keyboard (and including the given pair), for example, Googlle.com, WashingtonPoost.com, and Mozzilla.org. This algorithm can also insert characters at the beginning and at the end.

The method 300 includes a scan block 320 that scans typo samples using tracer technology (e.g., URL tracer technology 240). Such scanning can operate a network of virtual machines on a host machine. When a list of typo domain names is dropped into a queue, a daemon process running on the host machine can fetch the list and launch virtual machines to visit each domain name in the list. To avoid interference due to ill-behaved pop-up ads and latent scripts, the daemon process can restart a new virtual machine from a pre-configured clean state before scanning the next domain name. Before destroying the previous instance of a virtual machine, the daemon process can copy relevant recorded data to the host machine. The recorded data may include all secondary URLs visited and their ordering, the content of all HTTP requests and responses, a screenshot, etc. Upon completing the scan of the entire list of domain names, the daemon process can copy relevant data to an output folder on the host machine. While virtual machines are mentioned, the method 300 may use one or more alternative approaches. For example, a set of isolated browser instances can be used where each instance processes a unique primary URL.

The method 300 includes a rank block 330 that ranks domain parking services using, for example, tracer technology (e.g., URL tracer technology 240) and a top domain name approach. A ranking process can use recorded relevant data (e.g., as stored in an output folder) for data queries and analysis. Types of analysis include:

(A) Given lists of typo domain names belonging to a defined category, an analysis can determine how heavily the category is being typo-squatted and can identify dominant participants amongst domain parking services.

(B) Given a target domain name, an analysis divides its typo domain names into ranked sets according to the number of domain names parked with each of the parking services. Information such as client ID and anchor domain name can be used to further divide and rank the sets in order to help the owner of the target domain name prioritize an investigation. An anchor domain can be used to aggregate traffic from multiple typo domain names to simplify operations and to enable scalable typo-squatting. For example, typo domain names "ComFedBnak.com", "LaSalleBanl.com", and "SovererignBank.com" share the same anchor "baankaccount.com". In most cases, typo domain names sharing the same anchor domain name are registered to the same registrant according to the "WhoIs" database (WhoIs.com Pte, Ltd.); in other cases, anchor-based analysis allows for discovering domain name registrants that share the same postal address and that are most likely aliases of the same entity (e.g., company).

(C) For analyses that require searching for specific keywords (e.g., sexually-explicit keywords used in the analysis), an analysis of HTTP response pages occurs to extract all typo domain names that match a particular keyword or keywords.

The method 300 includes a rank block 340 for ranking domain parking service customers, for example, using client IDs in third party redirection URLs. As already mentioned, some redirection URLs include a "cid" field. More generally, some redirection URLs include a substring component that can be discovered and used to identify a client of a domain parking service. A particular example of this is the "cid", which exists in many redirection URLs. As discussed herein, a substring can be any subcomponent of a redirection field and could even be a non-static value. Accordingly, the terms "cid" or "cid field" refer to any of a variety of possible substrings used for purposes of identifying an entity (e.g., a client of a domain parking service). A domain parking service may embed a client ID in a third-party redirection URL for purposes of accounting, process implementation, etc. Through analyses of information in a cid field, various patterns emerge. For example, cid field information has proven useful in identifying a particular cybersquatter as a client of a domain parking service.

Overall, the method 300 identifies domain parking services and/or customers of a domain parking service using particular techniques. In addition to the aforementioned techniques, various exemplary techniques described herein can identify domain parking services and/or customers of a domain parking service. Further, various exemplary techniques allow a user to gather information, analyze gathered information and/or block domain names based on such analyses.

Two particular exemplary techniques are referred to herein as vertical analysis and horizontal analysis. These two techniques can assess the prevalence of typo-squatting and identify domain parking services involved in typo-squatting. The vertical analysis uses a single type of typos for a large number of target domain names while the horizontal analysis uses multiple types of typos for a smaller set of target domain names.

In a particular example, the vertical analysis technique scanned missing-dot typos of the top 10,000 most popular domain names (as measured by an opt-in toolbar) and showed that 5,094 (51%) of the 10,000 typo domain names were active at the time of the scan. Typo domain name customers were linked with parking domain service providers based on ads served. The parking domain services were then ranked according to their respective number of typo domain names. From this analysis, two parking domain services covered approximately 40% of the active typo domain names and the top six parking domain services together accounted for more than half (about 59%) of the active domain names and about 30% of the artificially generated missing-dot typo domains.

In a particular example, the horizontal analysis was used to analyze two sets of target domain names: the first set consisted of 30 target domain names for popular sites and the second set consisted of 30 high-risk target domain names associated with phishing attacks. For each target domain name, the horizontal analysis scanned its typo-neighborhood composed of typo domain names generated from the five typo-generation models (A-E of block 312 of FIG. 3). In the two sets of scans, 71% (2,233/3,136) and 42% (1,596/3,780) of the generated typo domain names were active, respectively; the top six domain parking services remained the same across all three sets of data except for minor re-ordering of ranking; the top two domain parking services stood out statistically; and the overall numbers for the top six domain parking services remain fairly consistent (i.e., the six together accounted for 40% to 70% of active typo domain names and around 30% of all generated typos).

As explained, the method 300 and various techniques can scan a large number of typo domain names, monitor third-party URL traffic, and group the domain names by behind-the-scenes domain parking service servers to facilitate further investigation. Further, some domain parking services provide additional information in their third-party URLs (i.e., secondary URLs) that can facilitate further analysis.

A horizontal analysis provided tens of anchor domain names. An analysis of traffic aggregation through these anchor domain names identified two client IDs used by a particular cybersquatter, one client ID for the typo domain names and the other client ID for the anchor domain names. The analysis continued by extracting all scanned domains parked with the identified domain parking service that used the two client IDs. Using a service known as "WhoIs" (WhoIs Pte, Ltd.), one may enter a domain name and identify the owner. For the horizontal analysis, "WhoIs" queries verified that almost all of the domain names were registered to the particular cybersquatter.

Figure 4:
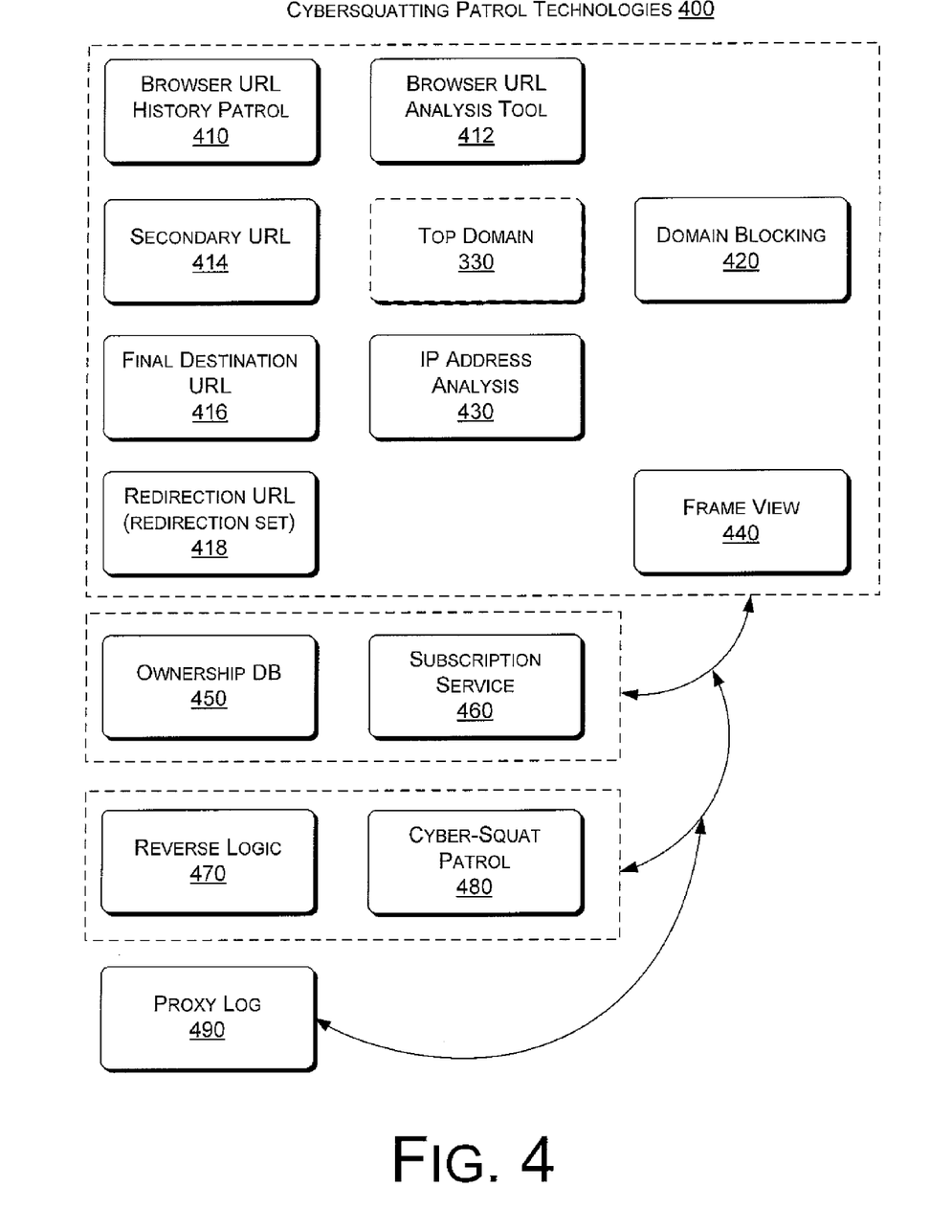
FIG. 4 is a diagram of various exemplary cybersquatting patrol technologies.

FIGS. 1, 2 and 3 show how various technologies can analyze cybersquatting practices. FIG. 4 shows additional technologies that optionally operate with one or more of the technologies described with respect to FIGS. 1, 2 and 3.

The cybersquatting technologies 400 are grouped loosely according to function. For example, the technologies 410, 412, 414, 416, 418, 420, 430 and 440 can be part of an exemplary browser application whereas the technologies 450 and 460 pertain to services for use by any of a variety of parties. Technologies 470 and 480 can uncover or police the Internet for cybersquatters and related practices while technology 490 pertains to proxy logs. Various technologies in FIG. 4 may be implemented as modules such as software modules.

The browser history patrol technology 410 allows a user to re-visit one or more URLs as recorded in a browser history file while recording all third-party redirections. Thus a browser application may include a browser history patrol technology module that allows a user to re-visit one or more recorded URLs for purposes of identifying one or more URLs that may have been responsible for serving inappropriate content and/or responsible for installing a spyware program or another malicious program.

The secondary URL technology 414, the final destination URL technology 416 and the redirection URL technology 418 can be part of or otherwise supported by the browser history patrol technology 410. For example, a browser history patrol module 410 can classify information acquired during a re-visit to a recorded URL as pertaining to a secondary URL, a final destination URL and/or a redirection URL.

The browser URL analysis tool 412 may aid in such classifications based on particular characteristics of information acquired during a re-visit. For example, a browser URL analysis tool can search URL strings acquired during a re-visit to identify information such as client IDs. Such a tool may be implemented as a feature (e.g., an add-on feature or a built-in feature) of a browser application and it may be part of a browser URL history patrol module 410.

An exemplary browser application includes a browser URL history patrol module 410 that records information during an initial visit to a URL and/or during a subsequent visit to a URL. For example, an exemplary browser application can receive a user command to display a history of visited primary URLs. Upon clicking on a primary URL, the browser application can display one or more non-primary URLs associated with the primary URL. Such non-primary URLs may be color coded or arranged with respect to function (or perceived function). For example, for a given primary URL, non-final destination, non-primary URLs may appear in a one color while a final destination URL may appear in a different color (e.g., red). Further, such a display may provide a user with an opportunity to access one or more of the URLs (e.g., clicking on a URL).

With respect to accessing one or more URLs recorded by a browser URL history patrol module 410, an exemplary URL analysis tool 412 can create an instance of a secure virtual machine or other secure environment that includes security features that help to ensure visitation to a URL does not corrupt an underlying operating system and/or an underlying virtual machine. The tool 412 can optionally create a secure environment for purposes of allowing code or content changes associated with a suspect URL to occur, or to be examined, without posing a risk to the underlying host machine.

The final destination URL technology 416 may be implemented as a software module as a feature of a browser application or as an add-on feature for a browser application. While a top domain view was discussed with respect to FIG. 3 (block 330), a final destination URL module 416 can address situations where a top domain view contains too much noise. The final destination URL technology 416 may be implemented as part of the URL tracing technology 240 of FIG. 2. In general, a final destination URL view can provide a cleaner subset of URLs for analysis. A final destination URL is a special case of a third-party redirection URL. The final destination URL normally appears in a browser application's browser address bar when all redirections have occurred.

In many instances, a final destination URL is the most important third-party URL because it ultimately determines the final content displayed by a user's browser application. Noting, however, scenarios exist where a primary URL remains displayed in a browser application's address bar even when content is fetched from one or more other third-party servers.

The HTML frame view technology 440 can address scenarios where a HTML frame is used and as a result the final destination URL does not represent the main page shown to the user. A HTML frame view module 440 can record the URL being associated with a HTML frame and indicate instances where a HTML frame is used to fill the entire browser display area. In the case where a HTML frame is used to fill the entire browser display area, an exemplary browser URL analysis tool 412 can visit the URL associated with the HTML frame and then record any action in conjunction with display of the HTML frame.

The redirection URL technology 418 can group primary URLs, which do not generate any significant third-party domain traffic, by their intra-domain redirection-URL set. For example, both of these two typo domain names share the same set and, therefore, belong to the same group:

Example 1: VictoirasSecret.com/ redirects to VictoirasSecret.com/home.php?r=&ref=and VictoirasSecret.com/pp.php.

Example 2: VictoraisSecret.com/ redirects to VictoraisSecret.com/home.php?r=&ref=and VictoraisSecret.com/pp.php.

The redirection URL technology 418 can be implemented as a feature of a browser application or as an add-on to a browser application. An exemplary redirection URL module 418 can parse a redirection URL to identify an associated redirection-URL set and can then use the identified set to classify one or more other typo domain names, for example, as belonging to the same class and, likely, to the same cybersquatter.

While the examples given for the redirection URL technology 418 pertain to typo domain names, such technology can classify composite domain names (e.g., consider "microsoft-outlook.com" as an example of a composite domain name a cybersquatter may try to use).

The cybersquatting technology 400 includes an IP address analysis tool 430 that can perform IP address-based grouping. Such a tool may perform IP subnet-based grouping and/or a WhoIs registrant-based grouping. Groupings based on IP address or registrant information can be complementary to a top domain view and a final destination view. The IP address analysis tool 430 can provide views that group domain names by cybersquatter/owner.

The domain blocking technology 420 can be implemented as feature of a browser application or as an add-on to a browser application. The domain blocking technology 420 optionally operates in conjunction with one or more other technologies described with respect to FIG. 4. For example, if a tool identifies a URL as being associated with a cybersquatter, such information may be communicated automatically or otherwise recorded for use by a domain name blocking module 420. In such an example, once a third-party domain name has been determined to be questionable or malicious, the domain name blocking module can prevent any browser instances from visiting the blocked domain name (e.g., directly and/or indirectly).

With respect to implementation of domain name blocking, an exemplary browser can maintain a black-list of domain names that it will not visit or an exemplary operating system can block connections to a black-listed domain name. As proxy servers in an environment can nullify the latter approach (browsers connect to a proxy, which then connects to the URL), an exemplary proxy server blocks black-listed domain names. Yet another approach communicates questionable domain names to a corresponding domain registrar for removal of these domain names from one or more servers.

The cyber-squat patrol technology 480 pertains to techniques applicable to non-typo domain name cybersquatters. For example, composite domain names are examples of domain names that have been used by cybersquatters. In general, analyses with respect to such domain names require more information than analyses with respect to typo domain names. An exemplary cyber-squat patrol technology 480 optionally operates in conjunction with a trademark database where trademarks associated with a particular owner are selected and combined in various manners and entered into a browser application. A database query such as a query for the WhoIs database or a TLD (Top-Level Domain) database may be used to find all domain names containing a certain substring associated with a trademark or trademarks. The cyber-squat patrol technology 480 can be implemented in conjunction with one or more other technologies discussed herein.

An exemplary method includes providing a list of registered domain names, providing a trademark, applying one or more algorithms that mimic typographical errors to the registered domain names or to the trademark to generate typographically erroneous domain names or typographically erroneous versions of the trademark, respectively, and identifying, from the first of registered domain names, one or more typographically erroneous registered domain names for the trademark. In turn, the method may include blocking web browser access to at least one of the one or more typographically erroneous registered domain names for the trademark. With respect to algorithms that mimic typographical errors, such algorithms may transpose two characters, replace a character with a neighboring character on a QWERTY keyboard, delete a character, etc.

The proxy log technology 490 uses information acquired from, or relating to, one or more proxy servers. A proxy server is a computer that offers a computer network service to allow clients to make indirect network connections to other network services. For example, a client can connect to a proxy server and then requests a connection, file, or other resource available on a different server. The proxy provides a resource either by connecting to a specified server or by serving the resource from a cache. In some instances, a proxy server may alter a client's request or a server's response for various purposes. The proxy log technology 490 can record proxy information. Such information can be optionally used in combination with one or more other technologies discussed herein.

The technologies 400 of FIG. 4 can operate in conjunction with, or as part of, the URL tracer technology 240, described with respect to FIG. 2, to provide users with visibility and control over third-party traffic.

Figure 5:
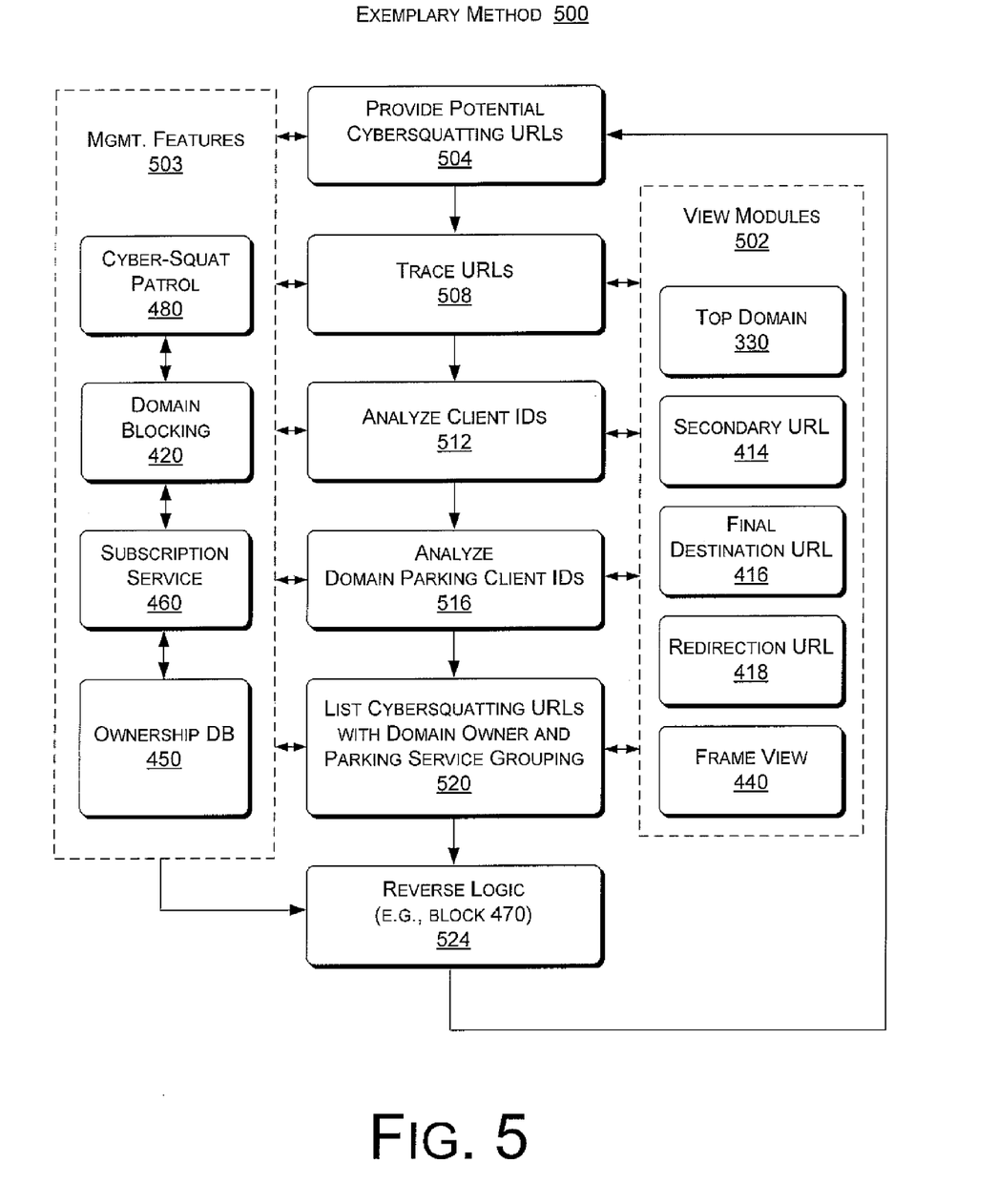
FIG. 5 is a diagram of an exemplary method for uncovering cybersquatters and cybersquatting URLs.

FIG. 5 shows an exemplary method 500 that uses the reverse logic technology 470 of FIG. 4. In such an example, logic used by a cybersquatter to generate typo domain names can be understood by analyzing some of the cybersquatter's typo domain names and, once understood, the logic can be used to generate and identify more of the cybersquatter's typo domain names. The method 500 may also use one or more of the other technologies shown in FIG. 4, some of which are shown in FIG. 5.

The method 500 commences in a provision block 504 that provides potential cybersquatting URLs. A trace block 508 traces the URLs, for example, using the URL tracer technology 240 of FIG. 2. An analysis block 512 analyzes URLs, uncovered by the tracing, for client IDs. Another analysis block 516 analyzes the client IDs in association with domain parking services. A list block 520 can list or classify cybersquatting URLs with domain name owner(s) and/or domain parking service(s).

Given some cybersquatting URLs and optionally ownership and/or domain parking service information, a reverse logic block 524 (see, e.g., the block 470 of FIG. 4) can analyze the URLs for techniques used to generate typo domain names and/or composite domain names. For example, the reverse logic block 524 may compare associated URLs (e.g., based on ownership) and determine one or more logical rules that could be used to generate at least some of the URLs. The reverse logic block 524 may then apply the rule(s) to generate more potential cybersquatting URLs. Such additional URLs may be provided by the provision block 504 for another round of analysis. The loop from providing to reverse logic analysis may repeat until the reverse logic block 524 fails to determine a new rule or to generate one or more "new" domain names.

With respect to reverse logic, the block 524 may use an algorithm that determines whether a domain name can be transformed to a legitimate domain name (e.g., a trademark or other popular term) within a certain number of iterations. For example, given the domain name "microsfto.com", such an algorithm can move each letter successively by one space (e.g., in a loop) where the number of iterations may be determined by the number of characters in the domain name (i.e., the portion prior to ".com"). Such an analysis may determine that a particular cybersquatter simply selects a character and moves that character to the end of a word. In turn, this information can be used to help identify domain names associated with the particular cybersquatter and to generate other typo domain names likely to be associated with the particular cybersquatter.

As indicated by the view module block 502, various URL related technologies 330, 414, 416, 418 and 440 may be used in conjunction with the method 500. Further, as indicated by the management features block 503, various management technologies 420, 450, 460 and 480 may be used in conjunction with the method 500. For example, the list block 520 can communicate URLs to an ownership database 450, which, in turn, can communicate information to a subscription service 460. The subscription service 460 can provide domain names to browser applications (e.g., via a network) such that a domain blocking feature of the browser application can block the domain names.

With respect to blocking domain names, an exemplary browser application or an exemplary subscription service can allow a user to choose one or more criteria for use in selecting domain names to block. For example, if a user is not interested in adult content, then the user may select an appropriate criterion that causes a subscription service or a browser application to load domain names associated with adult content to a domain blocking feature of the user's browser application. While adult content may be a popular criterion, a user may select from any of a variety of criteria including jewelry, magazine subscriptions, movie information, surveys, politics, etc.

As content served by a typo domain name (or composite domain name) may change over time or be adaptive with respect to history of users connecting (e.g., user address range), a subscription service may provide periodic updates for domain names.

While the example of FIG. 5 refers to a particular "reverse logic" technique, a method may use an exemplary techniques that builds a list of candidate typographically erroneous names by starting from a list of all registered domains and a list of known trademarks, and then determining which elements in the first list are likely modifications of items in the second list, for example, using a broader set of algorithms. Such a technique can further use one or more algorithms to generate domain names from a set of known trademarks which, in turn, allows one to identify domain names from an otherwise very large space of possibly erroneous names.

Figure 6:
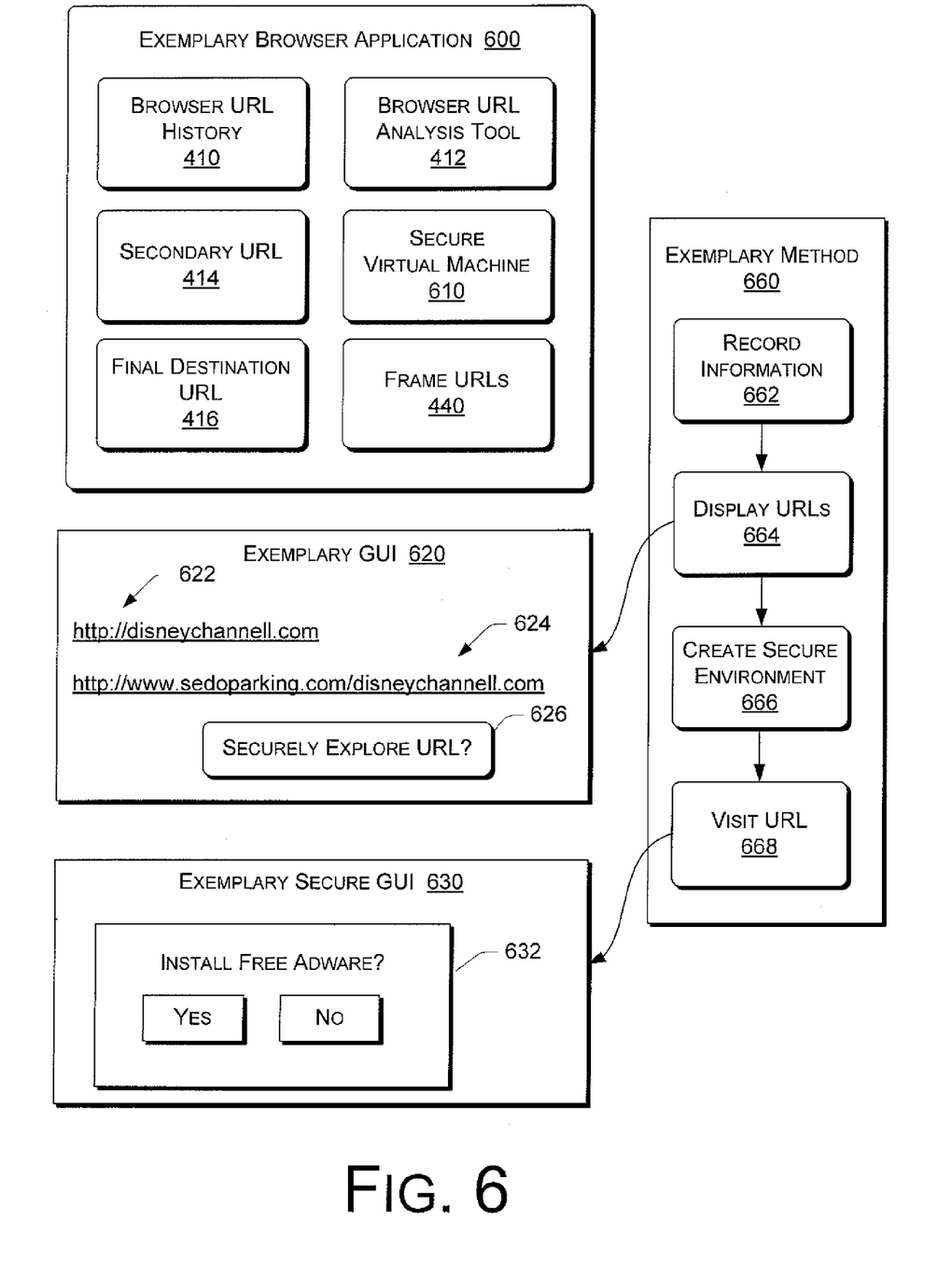
FIG. 6 is a diagram of an exemplary browser application and associated exemplary GUIs for managing URLs.

FIG. 6 shows an exemplary browser application 600 along with two exemplary graphical user interfaces (GUIs) 620 and 630 and an exemplary method 660. The browser application 600 includes modules for URL history 410, analyzing URLs 412, secondary URLs 414, final destination URLs 416, frame URLs and operating a secure virtual machine 610. An exemplary GUI 620 displays URL information to a user as collected during a recent web browsing episode. In this example, the user may be a parent examining a recent web browsing episode of a child (e.g., a young child). By using the GUI 620, a user can examine a typo domain name 622 and a corresponding secondary URL 624. The GUI 620 displays a button 626 that asks if the user would like to securely explore one of the URLs. For example, a user may highlight one of the URLs and then select the button 626.

The secure virtual machine module 610 can create an instance of a virtual machine in a secure environment and display a secure GUI 630. In the example of FIG. 6, the GUI includes a frame 632 (e.g., HTML frame) with a "yes" and a "no" button for responding to the question "Install Free Adware?". As previously mentioned, the underlying script for the buttons of the frame 632 may be corrupt. However, in such a secure environment, the user can make a selection and then investigate further any subsequent actions. Such a process can help a user maintain or fix a computer that has been victimized by malware.

An exemplary method 660 includes a recordation block 662 that records information during a web browsing session. After recordation, a display block 664 displays a primary URL 622 and a final destination URL 624 (or other URL) associated with the primary URL 622. A creation block 666 creates an instance of a browser application in a secure environment and a visitation block 668 directly visits the final destination URL using the browser application. In such a method, the display block 664 can access a browsing history file where the browsing history file includes the primary URL and the final destination URL (or one or more other URLs). As already mentioned, a user may wish to block a URL or domain name. Thus, the method 660 may include blocking the primary URL based at least in part on content displayed by the browser application during the visiting the final destination URL. Alternatively, or in addition to, the method 660 may block the final destination URL based at least in part on content displayed by the browser application during the visiting the final destination URL.

An exemplary method may include determining if a primary URL corresponds to a typographically erroneous domain name and/or include determining if the primary URL corresponds to a composite domain name, for example, that includes a trademark. Where a composite domain name includes a trademark, a method may determine if the owner of the composite domain name owns the trademark. In turn, a method may block a composite domain name if the owner of the domain name and the owner of the trademark differ.

Figure 7:
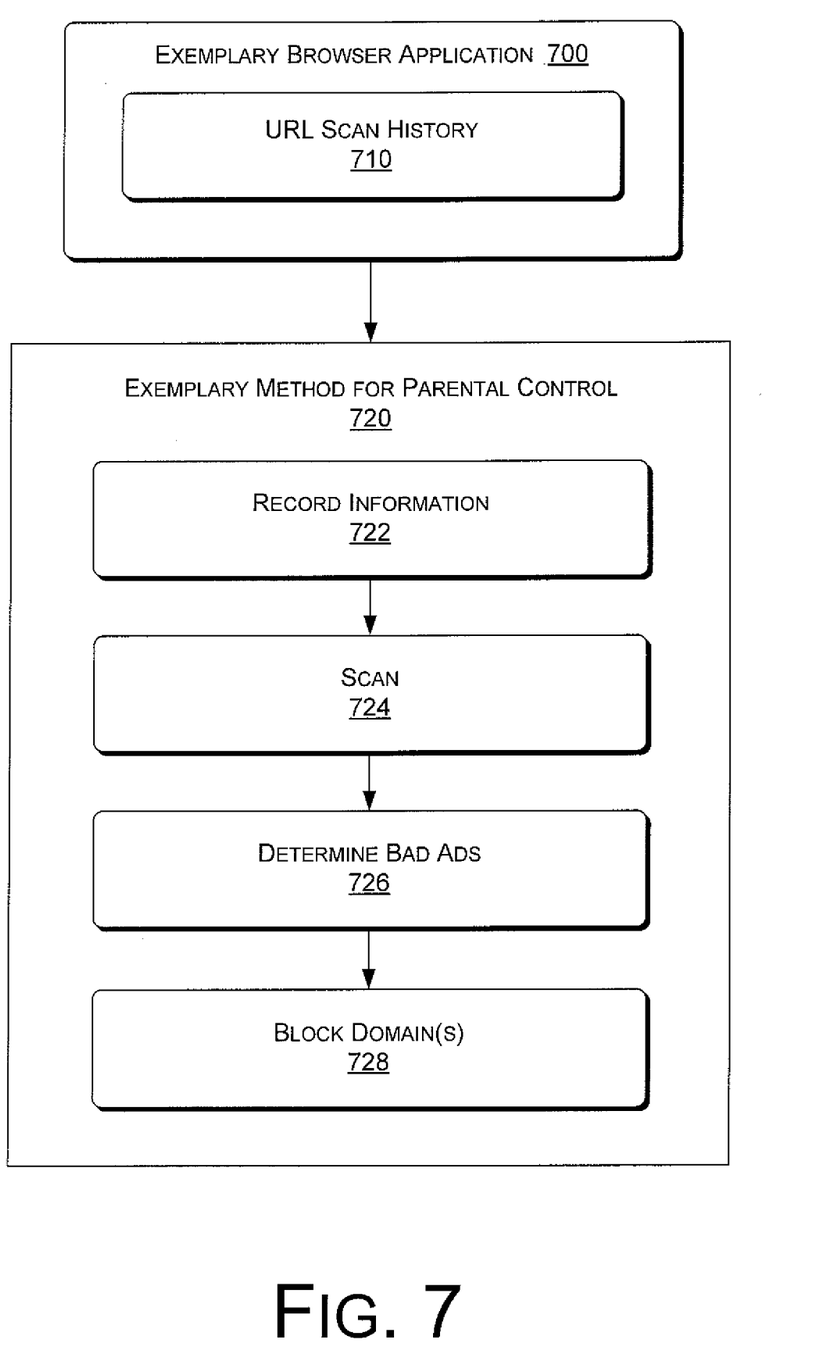
FIG. 7 is a diagram of an exemplary browser application and two exemplary scenarios.

FIG. 7 shows an example of a browser application 700 that includes an exemplary URL scan history module 710. In this example, the module 710 supports a "URL Scan History" view that records the timestamp of each primary URL visited and associated secondary URLs, grouped by domains. The module 710 also supports an alternative "Top Domains" view that, for each secondary-URL domain, displays all visited primary URLs that generated traffic to it. For example, a GUI can display domain names associated with more primary URLs closer to the top of the GUI.

For every URL displayed in either of the views, the module 710 provides a right-click menu with two options: (i) a "Go" option that allows the URL to be revisited (so that the user can figure out which ad came from which URL) and (ii) a "Block" option that allows blocking of all future traffic to and from that domain.

The exemplary browser application 700 can be used in any of a variety of scenarios. An exemplary method for parental control 720 allows a parent to record URL information per a record block 722. When the parent notices inappropriate ads being displayed to a child, the parent can use the module 710 to scan recently visited URLs, per a scan block 724, as recorded in the record block 722. For example, the parent may select the "Go" or "Block" option from the "URL Scan History" view. In a determination block 726, the parent can determine which ads server was responsible for serving the inappropriate ads. The parent can then select to block one or more domain names, per the action block 728, to thereby protect the child's future browsing activities.

Figure 8:
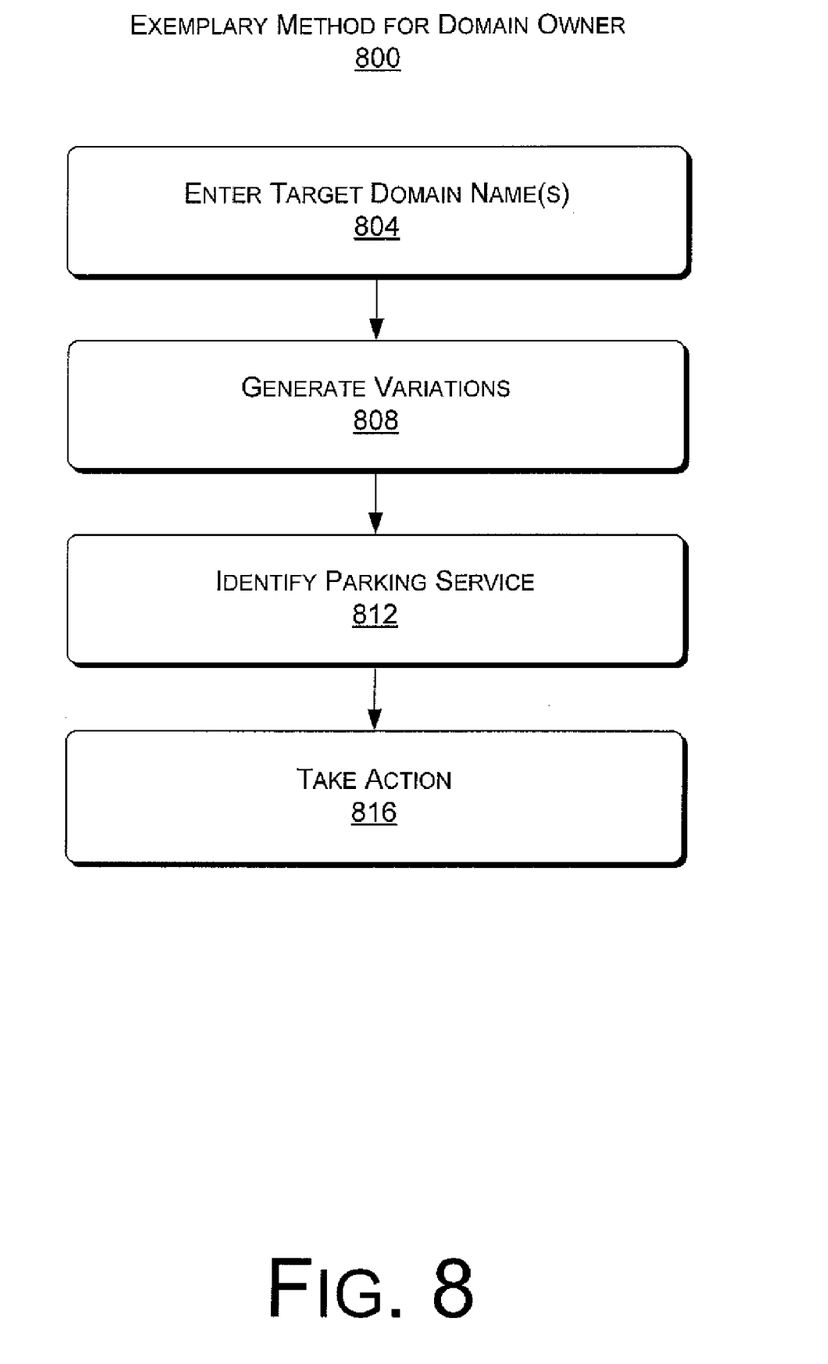
FIG. 8 is a diagram of an exemplary method for identifying a parking service associated with one or more target domain names.

FIG. 8 shows an exemplary method 800 for use by a domain name owner. Often it is too expensive for target-domain name owners to investigate and take action against a large number of individual typo domain names. To ease this burden, a module (e.g., optionally a browser module or add-on) can take a target domain name and automatically generates and scans its typo-neighborhood. For example, in an entry block 804, a user enters a target domain name. Next, a generation block 808 generates a typo-neighborhood using one or more domain name generation algorithms.

The user (e.g., trademark owner) can then use any of a variety of the view technologies (e.g., top domain names view) to identify those parking services that are heavily involved, per identification block 812. Once identified, the user can take appropriate action, per the action block 816. For example, such action may consider use of legal or other resources in a most efficient manner to address one or more entities involved in cybersquatting.

Such a domain parking-based analysis provides an efficient and low-cost solution for owners to file multi-domain complaints with major parking services, for example, to request banning of typo domain names from their parking programs.

Together with IP address-based grouping (e.g., block 430 of FIG. 4), such analysis also facilitates grouping of multiple typo domain names that are owned by the same registrant and/or hosted by the same ISP. This makes it easier for trademark owners to file multi-domain disputes against typo-domain registrants and to send multi-domain takedown notices to the hosting ISPs.

An exemplary module (e.g., optionally a browser module or add-on) can include features to help identify those typo-squatters who are redirecting traffic back to the target websites through their traffic-affiliate programs as an alternative way to profit from typo-squatting. For example, the typo domain name "oveestock.com" redirects to the domain name "click.linksynergy.com", which in turn redirects to the target site "overstock.com" (with a "siteID" field); similarly, the domain name "verizonwirewless.com" redirects to the domain name "service.bfast.com" and then to the target "verizonwireless.com" (with a "vendorid" field in the URL); "verizonwirelesa.com" redirects to "clickserve.cc-dt.com" and then to "verizonwireless.com".

Various technologies described herein can be applied to non-typo questionable domain names as well, which may be obtained from the WhoIs database, reverse IP lookups, DNS zone files, services that monitor new domain registrations, etc. For example, by scanning a list of 3,990 cybersquatting domain names, all of which contain the full name of the target company as a substring in their domain names, an analysis determined that 2,938 of the domain names were active and that six domain parking services together parked 949 of these domain names (i.e., 32%). Again, the top two stood out as parking 509 (17%) of the domain names and as parking 321 (11%) of the domain names. Such evidence uncovered using various exemplary techniques reveals that the involvement of some domain parking services in the cybersquatting business may go far beyond simple typo-squatting.

As described herein, domain name blocking can be implemented as part of a browser application that can use browsing history as an online, on-demand resource for deciding which domain names to block. For example, Firefox browser application users can use the userContent.css file to block selected domains and INTERNET EXPLORER® browser application (Microsoft Corporation, Redmond, Wash.) users typically use WINDOWS® hosts files to block unwanted ads. Because the advertising business is an important part of Internet economy that supports free information, wholesale blocking would be problematic. Instead, exemplary technologies described herein allow a user to determine which ad came from which domain and allow a user to implement on-demand domain blocking to discourage advertising companies from serving questionable ads.

Third-party URLs have been used by malicious websites to execute and install malcode on client machines and by advertising and web analytics companies to implement web beacons (or web bugs) to track users' browsing behaviors. As described herein, various exemplary technologies can expose behind-the-scenes exploiters that pretend to be advertisement syndicators, but serve vulnerability-exploiting scripts instead of ads.

As described herein, various exemplary "view" technologies (e.g., top domain names view, etc.) can be used to expose web beacons. For example, consider a set of primary URLs grouped under a single third-party domain (e.g., about 10 or so) and the fact that an externally-visible IP address of the user's machine has remained static. Under such circumstances, a report to a third party may indicate that the IP address has visited the set of URLs, which may raise privacy concerns if appropriate privacy statements are not posted. Even in the instance where the IP address is not static, third-party cookies can be used to provide correlation. An exemplary module causes a browser application to highlight all websites that use cookies in a bright red color to alert users of a potential privacy concern.

Various technologies discussed herein help provide visibility into cybersquatting (including typo-squatting) business practices. Various technologies may be implemented in conjunction with or as part of a browser application. Such an exemplary equipped browser application can allow parents to protect their children by blocking domain names that are serving harmful material to minors. Various exemplary technologies can provide a light-weight typo-patrol feature, or more generally, a cyber-patrol feature that allows an owner of a popular website(s) to monitor potential trademark violations.

Various exemplary technologies can be used by domain parking services to help enforce their policies by uncovering systematic cyber-squatting domain names that participate in their parking programs and to identify large-scale cyber-squatters among their customers.

Figure 9:
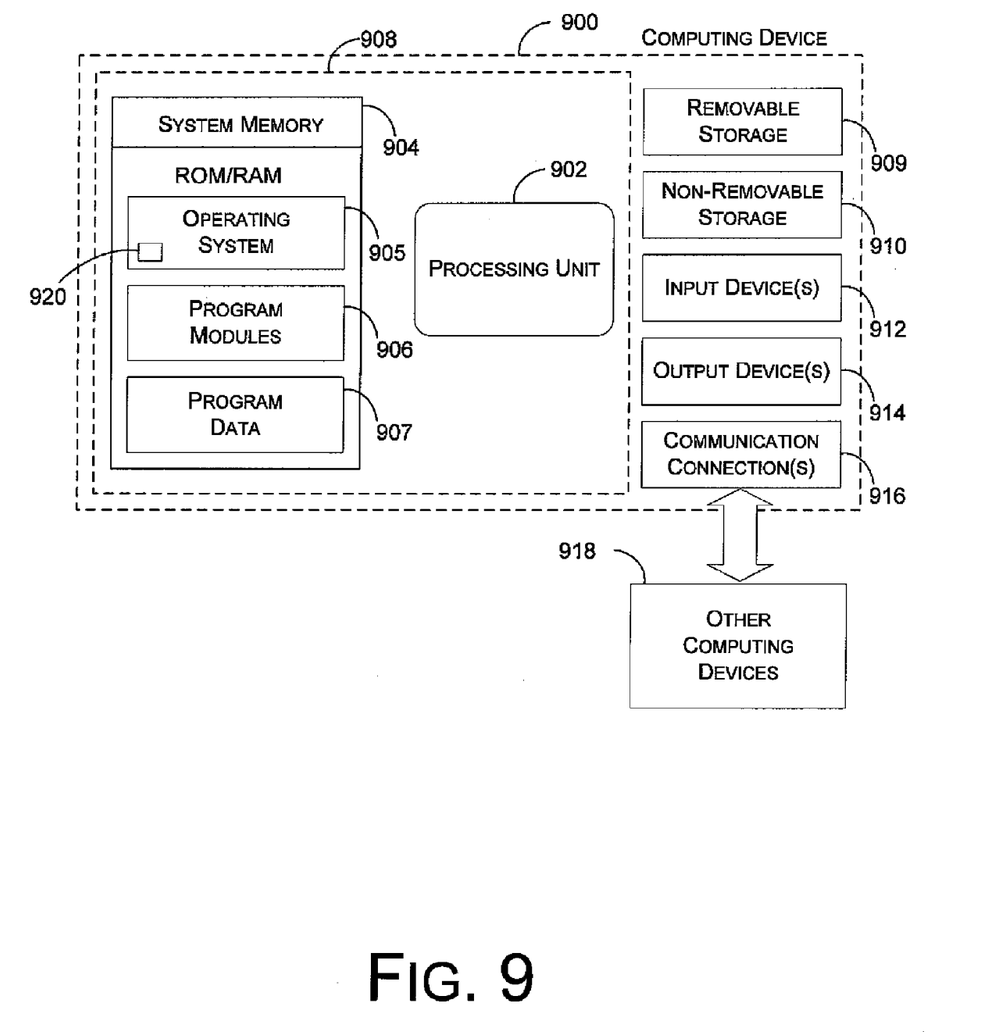
FIG. 9 is a diagram of various components of an exemplary computing device that may be used to implement various exemplary methods discussed herein.

FIG. 9 shows various components of an exemplary computing device 900 that may be used to implement part or all of various exemplary methods discussed herein.

The computing device 900 shown in FIG. 9 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 9, one exemplary system for implementing an exemplary cybersquatter management system or a method for uncovering and/or managing URLs associated with cybersquatters includes a computing device or uses a computing device, such as computing device 900 in a very basic configuration, computing device 900 typically includes at least one processing unit 902 and system memory 804.

Depending on the exact configuration and type of computing device, system memory 904 may be volatile (such as RAM), non-volatile (such as ROM, flash memory, etc.) or some combination of the two. System memory 804 typically includes an operating system 905, one or more program modules 806, and may include program data 907. This basic configuration is illustrated in FIG. 8 by those components within dashed line 908.

The operating system 905 may include a component-based framework 920 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well know in the art and need not be discussed at length here.

Computing device 900 may also contain communication connections 916 that allow the device to communicate with other computing devices 918, such as over a network. Communication connection(s) 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

The invention claimed is:

1. A method implemented at least in part by a computing device, the method comprising:
    displaying a primary URL;
    displaying a final destination URL associated with the primary URL;
    creating an instance of a browser application in a secure environment;
    extracting client identification information from a Client ID (cid) field in the final destination URL;
    blocking the final destination URL if the final destination URL contains a particular client ID; and
    directly visiting the final destination URL using the browser application if the final destination URL does not contain the particular client ID.

2. The method of claim 1 wherein the displaying a final destination URL comprises accessing a browsing history file wherein the browsing history file comprises the primary URL and the final destination URL.

3. The method of claim 1 further comprising blocking the primary URL based at least in part on content displayed by the browser application during the visitation to the final destination URL.

4. The method of claim 1 further comprising blocking the final destination URL based at least in part on content displayed by the browser application during the visitation to the final destination URL.

5. The method of claim 1 further comprising determining if the primary URL corresponds to a typographically erroneous domain name.

6. The method of claim 1 further comprising determining if the primary URL corresponds to a composite domain name that comprises a trademark.

7. The method of claim 6 further comprising determining if the owner of the composite domain name owns the trademark.

8. The method of claim 7 further comprising blocking the composite domain name if the owner of the domain name and the owner of the trademark differ.

9. A computer-readable storage medium comprising processor-executable instructions for performing the method of claim 1.

10. A method implemented at least in part by a computing device, the method comprising:
- providing a typographically erroneous domain name;
- tracing the domain name wherein the tracing comprises entering the domain name as part of a URL and recording one or more subsequent URLs;
- identifying a domain parking service for the domain name based at least in part on information in one of the recorded URLs;
- determining client identification information in at least one of the recorded URLs wherein the client identification information identifies a customer of the domain parking service, wherein the client identification information is a particular client identifier extracted from a Client ID (cid) field of the final destination URL; and
- blocking one or more domain names based at least in part on the client identification information.

11. The method of claim 10 further comprising storing the client identification information in a database wherein the database comprises a database for use in blocking domain names.

12. The method of claim 10 further comprising analyzing the typographically erroneous domain name for a logical rule wherein application of the logical rule to a legitimate domain name generates the typographically erroneous domain name.

13. The method of claim 10 further comprising viewing a listing of one or more secondary URLs associated with the domain name.

14. The method of claim 10 further comprising viewing a listing of one or more redirection URLs associated with the domain name.

15. A computer-readable storage medium comprising processor-executable instructions for performing the method of claim 10.

16. A method implemented at least in part by a computing device, the method comprising:
- providing a typographically erroneous domain name;
- tracing the domain name wherein the tracing comprises entering the domain name as part of a URL and recording one or more subsequent URLs;
- determining a redirection-URL set in at least one of the recorded URLs; and
- blocking one or more domain names based at least in part on the client identification information in the redirection-URL set, wherein the client identification information is a particular client identifier extracted from a Client ID (cid) field of the redirection-URL.

17. The method of claim 16 wherein the determining a redirection-URL set comprises comparing at least one of the recorded URLs to a previously recorded URL for a different typographically erroneous domain name.

18. The method of claim 16 wherein the redirection-URL set comprises an intra-domain redirection-URL set.

19. A computer-readable storage medium comprising processor-executable instructions for performing the method of claim 16.

20. A computing device comprising:
- a processor; and
- a memory coupled to the processor, the memory comprising computer-program instructions executable by the processor for:
  - providing a typographically erroneous domain name;
  - tracing the domain name wherein the tracing comprises entering the domain name as part of a URL and recording one or more subsequent URLs;
  - identifying a domain parking service for the domain name based at least in part on information in one of the recorded URLs;
  - determining client identification information in at least one of the recorded URLs wherein the client identification information identifies a customer of the domain parking service, wherein the client information is a particular client identifier extracted from a Client ID (cid) field of the final destination URL; and
  - blocking one or more domain names based at least in part on the client identification information.

21. The method of claim 20 further comprising analyzing the typographically erroneous domain name for a logical rule wherein application of the logical rule to a legitimate domain name generates the typographically erroneous domain name.

* * * * *